US008631008B1

(12) United States Patent
G. et al.

(10) Patent No.: US 8,631,008 B1
(45) Date of Patent: Jan. 14, 2014

(54) SYSTEMS AND METHODS FOR INDEXING ELECTRONIC CONTENT THAT INVOLVES EXTERNAL INTERACTION

(75) Inventors: Akshaya G., Karnataka (IN); Thangaraj Umapathy, Karnataka (IN)

(73) Assignee: Adobe Systems Incorporated, San Jose, CA (US)

( * ) Notice: Subject to any disclaimer, the term of this patent is extended or adjusted under 35 U.S.C. 154(b) by 191 days.

(21) Appl. No.: 12/895,919

(22) Filed: Oct. 1, 2010

(51) Int. Cl.
*G06F 7/00* (2006.01)
*G06F 17/30* (2006.01)

(52) U.S. Cl.
USPC .................... 707/736; 707/711; 707/999.003

(58) Field of Classification Search
None
See application file for complete search history.

(56) References Cited

U.S. PATENT DOCUMENTS

| | | | | |
|---|---|---|---|---|
| 2002/0133526 | A1* | 9/2002 | Cronk et al. | 709/100 |
| 2009/0138528 | A1* | 5/2009 | Manzano | 707/203 |
| 2009/0228504 | A1* | 9/2009 | Brown et al. | 707/101 |
| 2011/0239037 | A1* | 9/2011 | Peng et al. | 714/3 |

* cited by examiner

*Primary Examiner* — Azam Cheema
(74) *Attorney, Agent, or Firm* — Kilpatrick, Townsend & Stockton

(57) ABSTRACT

One exemplary embodiment involves receiving electronic content from a primary indexing application at a supplemental indexing application. The primary indexing application and the supplemental indexing application are separate applications executing on one or more devices. The supplemental indexing application identifies an external interaction that occurs during execution of the electronic content. Since the external interaction is not available from the supplemental indexing application, the supplemental indexing application communicates with the primary indexing application to receive information associated with the external interaction. The supplemental indexing application identifies one or more content-descriptive terms for the electronic content using the information associated with the external interaction.

15 Claims, 3 Drawing Sheets

SYSTEMS AND METHODS FOR INDEXING ELECTRONIC CONTENT THAT INVOLVES EXTERNAL INTERACTION

FIELD

This disclosure relates generally to computer software that runs, displays, provides, shares, or otherwise uses electronic content.

BACKGROUND

The Internet and other computing networks make vast quantities of inter-linked hypertext documents and other electronic content available for access all around the globe. A person is able access a specific web page from amongst billions of available web pages, for example, by entering a Uniform Resource Locator (URL) that identifies from where the electronic content associated with the web page can be requested and received.

Electronic content can also be identified using a search engine. Search engines allow a person to enter search terms that are then used by the search engine to identify search results, for example, web pages and other electronic content that contain or is otherwise associated with the search terms. The search engine may provide a user interface as a web page. Search terms that are entered on such a user interface are provided to a server that processes a search and returns search results for display to the person who initiated the search. Search engines perform searches for electronic content using an index that associates electronic content with particular search terms. Using an index facilitates quick identification of search results based on the given search terms. To provide accurate search results, a search engine provider creates and maintains such an index with information that accurately associates search terms with electronic content.

Search engine providers use indexing applications to perform indexing of web pages and other electronic content. The indexing applications associate such content with search terms in the search engine provider's index. An indexing application typically downloads and caches a set of web content and then goes through the set to provide the information used in the search index. An indexing application can identify search terms in some types of content, such as within Hyper-Text-Markup-Language-based (HMTL) documents, by simply identifying text within the documents. Identifying search terms for other types of electronic content, however, has required supplemental search term identification capabilities. An indexing application may encounter electronic content that does not expose content-defining text or in which it is otherwise more difficult to identify search terms. For example, appropriate search terms may be more difficult to identify for a rich Internet application, for example, a .swf file that executes on an Adobe® Flash® Player. To index such content, indexing applications have used supplemental applications to identify appropriate search terms for use in the index.

In various circumstances, a search engine provider may require separation of its primary indexing application that provides its core indexing functionality from a secondary application the provides supplemental indexing capabilities. For example, such separation may facilitate use of supplemental capabilities provided to a search engine provider by a third party. The search engine provider may desire to develop is core, primary indexing application on its own and then supplement those indexing capabilities by implementing additional indexing functionality provided in supplemental indexing applications provided by one or more third parties. As a specific example, a third party may provide end users with a plug-in components for playing specific types of files or other content and may provide the search engine provider with a customized supplemental indexing application that is specially targeted to facilitate indexing of those specific types of content. The third party may be better positioned to update and otherwise provide the supplemental indexing application given its familiarity with the plug-in components. With the separately-provided supplemental indexing application, the search engine provider can use its primary indexing application to identify search terms in other types of content and also use the supplemental indexing application provided by the third party to identify search terms in the specific type of content that plays through the third party's plug-in components.

Existing indexing capabilities do not adequately address search engine providers requirements of performing indexing in a contained, accelerated environment in which Internet access is unavailable or limited. Search engine providers have found it advantageous, for example, to download groups of web pages and other content for indexing in an isolated environment that is not encumbered by repeated access to a network retrieve individual content items. The use of supplemental indexing applications in such environments has created unresolved issues. For example, supplemental indexing applications have encounter errors in attempting to identify terms for rich Internet and other non-text content that requires access to other content that is not available to the supplemental indexing application in the isolated indexing environment. The supplemental indexing application must identify search terms in an execution context that differs from the context in which end users would typically execute the context. For example, while an end user may view a rich Internet application as part of a web page that includes other electronic content, a supplemental indexing application is required to analyze that rich Internet application without access to that other electronic content. For example, an indexing application may provide individual files to a supplemental indexing application without providing external content that is referenced by the provided file. Because the external content is not available, the specified external interactions are not adequately examined.

Accordingly, existing supplemental indexing applications do not adequately identify search terms that account for externally-referenced external content because of the isolated environment in which they are frequently required to execute. As another specific example, a supplemental indexing applications may execute content and identify execution branches, but fail to properly handle content that specify external interactions by invoking external content items or waiting for invocation from such external content. Supplemental indexing applications have encountered runtime errors and/or failed to fully identify appropriate search terms in such circumstances. As another specific example, if a web page includes an HTML file (H1.html) and embeds two .swf files (F1.swf and F2.swf), prior indexing techniques have involved providing F1.swf to the supplemental indexing application in isolation. Supplemental indexing applications have not previously been able to fully provide search terms that account for the interactions of such a .swf with external content, such as interaction with the separate, but related, H1.html, and F2.swf content.

SUMMARY

One exemplary embodiment involves receiving electronic content from a primary indexing application at a supplemental indexing application. The primary indexing application and the supplemental indexing application are separate applications executing on one or more devices. The supplemental indexing application identifies an external interaction that occurs during execution of the electronic content. Since the external interaction is not available from the supplemental indexing application, the supplemental indexing application communicates with the primary indexing application to receive information associated with the external interaction. The supplemental indexing application identifies one or more content-descriptive terms for the electronic content using the information associated with the external interaction.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Figure 1:
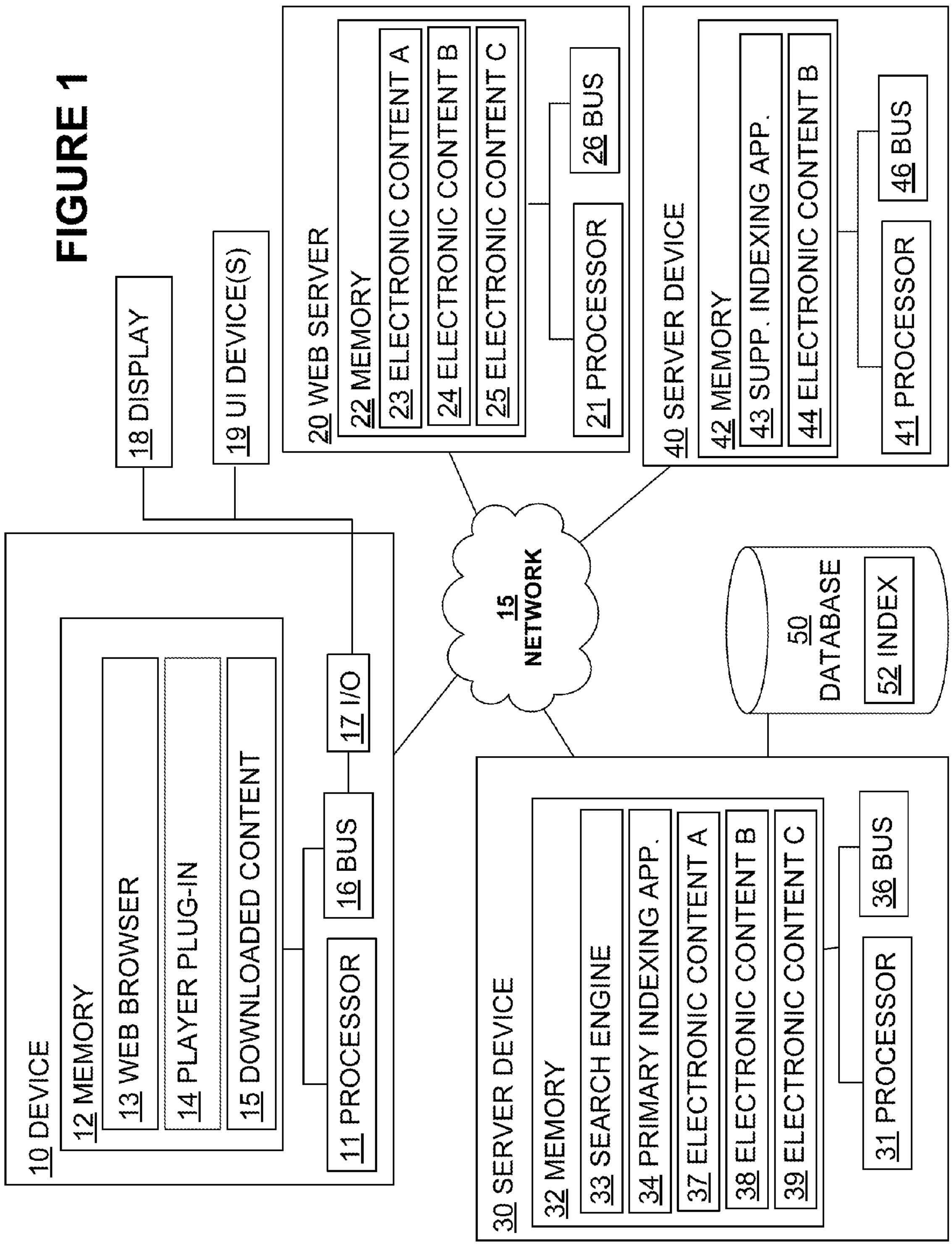
FIG. 1 depicts an exemplary computing environment in which an electronic content is available and indexed for search engine searching.

Methods and systems are disclosed that identify search terms for electronic content. A primary indexing application obtains a group of related electronic content items. While the primary indexing application is able to directly identify search terms for some of the items such as HTML documents, it sends other items, such as rich Internet applications, to a supplemental indexing application. The supplemental indexing application receives such a content item, for example, a .swf file, executes it, identifies search terms during that execution, and returns those search terms to the primary indexing application. If execution of the content item involves any external interactions, the supplemental indexing application initiates and receives messages with the primary indexing application to obtain information associated with those external interactions so that this information can be used in identifying appropriate search terms to associate with the content item. When the phrase "the external interaction is not available from the supplemental indexing application" is used, it means that the external interaction requires something (e.g., using another file, accessing a shared object, using a socket connection, etc.) that the supplemental indexing application cannot itself perform because of its isolated execution context. Since the interaction called for by the examined content is not available, the supplemental indexing application instead interacts with the primary indexing application to complete its identification of search terms.

Separating primary and supplemental indexing functionality allows supplemental indexing functionality that is tailored to particular non-text content types, e.g., rich Internet applications, movies, audio, executable programs, etc., to be developed and implemented separate from the primary indexing functionality, which may focus on text-based search term extraction.

Indexing can be configured such that, even though electronic content is executed in isolation, appropriate search terms are still identified. A supplemental indexing module is able to identify appropriate search terms for a piece of content executed in its isolated environment by communicating with a primary indexing application so that the isolated execution of execution of the piece of content mimics execution of the piece of content executing in its normal context. If a piece of content normally uses information from other documents and applications that collectively define a web page, when executed in the isolated environment of supplemental indexing application, that content has access to that same information. Access to that information is provided through communications with the primary indexing application that provides or obtains the necessary information. These indexing techniques are particularly useful in indexing a rich Internet application that executes inside a web browser context in which information is shared between the rich Internet application and other associated items displayed by the browser, such as associated HTML content and other rich Internet applications that are included in a same web page or otherwise associated.

The following example is provided to further introduce the subject matter of certain embodiments. In this exemplary scenario, a search engine's primary indexing module encounters a file, F1.swf, and invokes a supplemental indexing application to determine content-descriptive terms for it. That supplemental indexing application then inspects F1.swf, determines that it uses H1.html content, and sends a notification to the primary indexing application. The primary indexing module uses its cached information to populate a data structure that is returned to the supplemental indexing application. The supplemental indexing application then uses this data structure to supplement the content-descriptive terms that are then returned to the indexing application for use in the index as content-descriptive text for F1.swf. Certain embodiments thus improve content-descriptive term identification functionality while still allowing specialized supplemental indexing applications to be used in isolated environments.

FIG. 1 depicts an exemplary computing environment in which electronic content is available and indexed for search engine searching. The methods and systems disclosed herein are also applicable on other computing systems and environments. The environment shown in FIG. 1 comprises a wired or wireless network 15 connecting various devices 10, 20, 30, 40. In one embodiment, the network 15 comprises the Internet. In other embodiments, other networks, intranets, or combinations of networks may be used. Alternative configurations are possible.

As used herein, the term "device" refers to any computing or other electronic equipment that executes instructions and includes any type of processor-based equipment that operates an operating system or otherwise executes instructions. A device will typically include a processor that executes program instructions and may include external or internal components such as a mouse, a CD-ROM, DVD, a keyboard, a display, or other input or output equipment. Examples of devices are personal computers, digital assistants, personal digital assistants, cellular phones, mobile phones, smart phones, pagers, digital tablets, laptop computers, Internet appliances, other processor-based devices, and television viewing devices. Exemplary devices 10, 20, 30, 40 are respectively used as special purpose computing devices to provide specific functionality offered by their respective applications and by the interaction between their applications. As an example, device 10 is shown with a display 18 and various user interface devices 19. A bus, such as bus 16, bus 26, bus 36, or bus 46, will typically be included in a device as well.

As used herein the phrase "electronic content" refers to any text, graphics, video, audio, application, or other material that can be stored on and/or presented on or through a computer or other device.

As used herein, the term "application" refers to any program instructions or other functional components that execute on a device. An application may reside in the memory of a device that executes the application. As is known to one of skill in the art, such applications may be resident in any suitable computer-readable medium and execute on any suitable processor. For example, as shown the devices 10, 20, 30, 40 each comprise a computer-readable medium such as memory 12, 22, 32, 42 coupled to a processor 11, 21, 31, 41 that executes computer-executable program instructions and/or accesses stored information. Such processors 11, 21, 31, 41 may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

As used herein the phrase "indexing application" refers to any application used to create, maintain, or otherwise edit an index, including but not limited to an application that identifies content-descriptive terms in an index that associates such content-descriptive terms with associated purposes to support search engine searching.

As used herein the phrase "rich Internet application" refers to any application that provides functionality or features that a standard web browser cannot itself interpret or otherwise use. Use of a rich Internet application requires something more than a standard web browser. As examples, some rich Internet applications can be delivered by way of a site-specific browser, a browser plug-in, or a virtual machine.

As used herein the phrase "content-descriptive term" refers to any letter, number, symbol, word, or other alphanumeric symbol or combination of symbols that is descriptive of a piece of electronic content. Such a term may or may not be found within the content for which it is descriptive. A term may have one or more words.

A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may comprise processor-specific instructions generated by a compiler and/or an interpreter from code written in any suitable computer-programming language, including, for example, C, C++, C#, Visual Basic, Java, Python, Perl, JavaScript, and ActionScript.

In FIG. 1, web server 20 makes a web page available over network 15 by allowing access to electronic content A 23, electronic content B 24, and electronic content C 25. As an example (referred to hereinafter as the HTML/swf example), electronic content A 23 may be a file H1.html with HTML statements that define a general web page appearance and reference two embedded pieces of content, which in this example are two .swf files F1.swf and f2.swf provided as electronic content B 24 and electronic content C 25, respectively.

The web server 20 makes the web page of electronic content A 23, electronic content B 24, and electronic content C 25 available for download to one or more devices through network 15. In the example of FIG. 1, electronic content A 23, electronic content B 24, and electronic content C 25 are downloaded as downloaded content 15 for use through web browser 13. Web browser 13 can be any type of application that interprets or otherwise allows electronic content to be displayed, played, or otherwise used on a device. In the HTML/swf example, web browser 13 downloads and parses H1.html and some of the aspects of the web page. The web browser also identifies that the web page includes F1.swf and F2.swf and downloads those files. However, the web browser 30 is unable to itself use the F1.swf and F2.swf. Instead, the web browser relies upon player plug-in 14 to execute and provide the web page aspects that are provided by F1.swf and F2.swf. In this example, the downloaded content 15 thus comprises three files H1.html, F1.swf and F2.swf that together provide the web page on device 10. The web page features provided by these different files can interact. For example, F1.swf may access a name or other piece of data from H1.html.

In FIG. 1, web browser 13 can also be used to receive other web content. It can download a search engine 33 that allows searching of electronic content, such as electronic content A 23, electronic content B 24, and electronic content C 25. Server device 30 may make such a search engine 33 available to device 10 and other devices for searching for electronic content that is available through network 15 or any other network as may be appropriate.

The search engine 33 provides search results based on one or more received search terms. For example, the search engine 33 may receive several search terms for a requested electronic content search and use those terms to identify one or more search results based upon an identified association between the one or more search terms and electronic content that is available. For example, if the search terms "united" "states" "patent" "trademark" "office" are received in a search request from device 10, the search engine may identify a first search result that is a piece of electronic content available by accessing the United States Patent and Trademark web site. Additional search results may also be identified. The search engine 33 may provide a listing of the search results in response to the request. For example, a list of electronic content items along with associated links (e.g., www.uspto.gov), may be provided to device 10.

The search engine 33 utilizes index 52 to identify appropriate search results. Such an index 52 may identify associations between individual pieces of electronic content and one or more content-descriptive terms. As a specific example, an HTML file may be associated with one or more content-descriptive terms that include words from one or more of the HTML tags that define the electronic content of the HTML file. As another example, a .swf file may be associated with one or more content-descriptive terms that include terms that appear in titles, text, and other aspects of the electronic content of the .swf file. As yet another example, a .mov file may comprise a video and be associated with one or more words that are spoken and/or displayed in the video and/or terms from metadata associated with the video.

Search engine 33 can use any of the many available and to-be-developed algorithms or techniques for identifying electronic content using received search terms and the index 52. As an example, search engine 33 may identify and prioritize electronic content items listed in the index 52 as associated with search terms. Results may or may not be prioritized based upon how many of one or more received search terms match the content descriptive terms of a piece of content in the index 52. Search results may additionally or alternatively be selected and/or prioritized based on other information, including but not limited to, content ratings, prior content use or linking history, content provider identity, or any other factor.

By providing an association between content-descriptive terms and electronic content, index 52 facilitates search engine 33 identifying and providing appropriate search results for received search terms. The index 52 is shown as provided on a database 50 that is accessed by the search engine 33. In an alternative embodiment, the index 52 is stored in memory 32 of device 30. In another alternative embodiment, the index 52 is stored in another device (not shown) that is accessed by search 33 over network 15.

The primary indexing application 34 is used to create and/or update the index 52. While the primary indexing application is shown in FIG. 1 as provided on server 30, it can alternatively be separated from search engine 33 and/or provided on any other device as may be appropriate. The primary indexing application 34 analyzes pieces of electronic content and identifies content-descriptive terms that will be associated with the individual pieces of electronic content in the index 52. In certain uses, such terms may be identified for vast amounts of electronic content. For example, index 52 may provide information about most or all of the electronic content that is available on the Internet. Accordingly, the primary indexing application 34 may be configured to maximize processing and communication efficiency. It may have limited access to electronic content that is retrieved for analysis purposes to a single retrieval. Electronic content of a one or more web pages may be downloaded and processed in groups or individually.

In FIG. 1, the primary indexing application 34 downloads electronic content A 23, electronic content B 24, and electronic content C 25 together for indexing purposes and stores local copies as electronic content A 37, electronic content B 38, and electronic content C 39. The primary indexing application 34 determined that it can itself determine content-descriptive terms for electronic content A 37 but that it cannot itself determine content-descriptive terms for electronic content B 38 or electronic content B 39. This may be the case, for example, in the HTML/swf example, where electronic content A 37 is the H1.html file, electronic content B 38 is the F1.swf file, and electronic content C 39 is the F2.swf file. The primary indexing application 34 communicates with the supplemental indexing application 43 to identify content-descriptive terms for any electronic content that the primary indexing application 34 cannot, or otherwise determined to not, analyze itself.

Supplemental indexing application 43 is shown on separate server device 40 such that it communicates with the primary indexing application 34 through network 15. In another embodiment, the primary indexing application 34 and supplemental indexing application 43 are located on a single device or on devices that communicate with one another directly or through a local area network.

Figure 2:
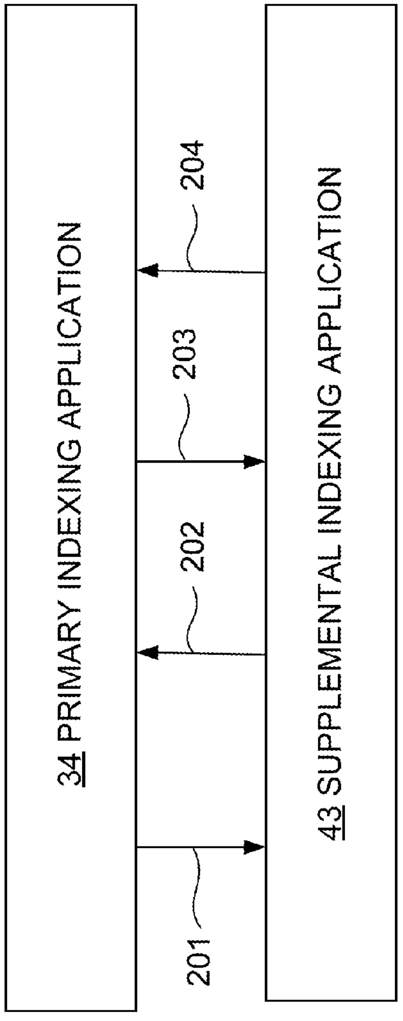
FIG. 2 illustrates exemplary communications between separate indexing applications that support identification of content-descriptive terms for electronic content.

FIG. 2 illustrates exemplary communications between the primary indexing application 34 and the supplemental indexing application 43 that support identification of content-descriptive terms for a piece of electronic content. The primary indexing application 34 sends a first communication 201 to the supplemental indexing application 43 that provides the piece of content, which in this example is electronic content B 38, for the supplemental indexing application 43 to analyze. The supplemental indexing application 43 stores a copy of the electronic content B 44 on device 40 (shown in FIG. 1) and begins its analysis.

To identify content-descriptive terms for the electronic content B 44, the supplemental indexing application 43 may execute, simulate execution of, or otherwise use electronic content B 44 in a way that the primary indexing application cannot or will not. For example, if the primary indexing application 34 cannot execute a rich Internet application, the supplemental indexing application 43 may comprise functionality that mimics execution of the rich Internet application, for example, by providing site-specific browser, plug-in, or virtual machine execution or use functionality.

If the supplemental indexing application 43 identifies an external interaction of the electronic content B 44 that it is analyzing, the supplemental indexing application 43 sends a message 202 to the primary indexing application 34 so that its analysis can take into account the external interaction. The message may identify one or more other pieces of content or other information required to account for the external interaction from the electronic content B 44. In the HTML/swf example, where electronic content A 37 is the H1.html file, electronic content B 38 is the F1.swf file, and electronic content C 39 is the F2.swf file, the supplemental indexing application 43 may analyze its copy of the electronic content B 44, and determine that information from, or otherwise available from, H1.html (electronic content A 37 on server device 30) is required. After identifying that such information is required, the supplemental indexing application 43 sends a message 202 to the primary indexing application 34 identifying or requesting the required information. In another example, the external interaction may involve a request that external content, such as electronic content A 37 perform a particular function.

The primary indexing application 34 receives message 202 and obtains any requested information, performs any requested functions and sends a response message 203 to the supplemental indexing application 43. If there is any responsive information and/or return parameters from a called function, the parameters and/or information can be included in the response message 203. The supplemental indexing application 43 uses any responsive information in message 203 to complete its analysis of the electronic content B 44. In particular, the supplemental indexing application 43 can use that information to identify content-descriptive terms for the electronic content B 44. Once the supplemental indexing application 43 has finished analyzing the electronic content B 44, it sends a message 204 to the primary indexing application indicating that the analysis is complete. The message 204 may include one or more content-descriptive terms identified for the electronic content B 44. The one or more content-descriptive terms may additionally or alternatively be sent directly to index 52 (shown in FIG. 1) or to any other device or application as may be appropriate for a particular indexing system implementation.

Figure 3:
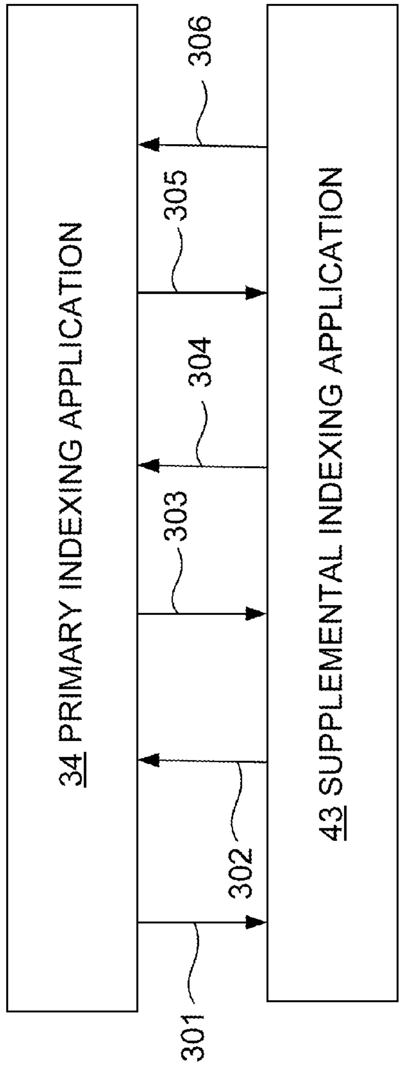
FIG. 3 illustrates exemplary communications between a primary indexing application and a supplemental indexing application that support identification of content-descriptive terms for a piece of electronic content.

FIG. 3 illustrates exemplary communications between the primary indexing application 34 and the supplemental indexing application 43 that support identification of content-descriptive terms for a piece of electronic content. The primary indexing application 34 sends a first communication 301 to the supplemental indexing application 43 that provides the piece of electronic content, electronic content B 38, for the supplemental indexing application 43 to analyze. The supplemental indexing application 43 stores a copy of the electronic content B 44 on device 40 (shown in FIG. 1) and begins its analysis.

In FIG. 3, the supplemental indexing application 43 identifies an external interaction of the electronic content B 44 that it is analyzing. It sends a message 302 to the primary indexing application 34 so that its analysis can take into account the external interaction. The message identifies one or more other pieces of electronic content or other information required to account for the external interaction from the electronic content B 44. In the HTML/swf example, where electronic content A 37 is the H1.html file, electronic content B 38 is the F1.swf file, and electronic content C 39 is the F2.swf file, the supplemental indexing application 43 may analyze its copy of the electronic content B 44, and determine that information from, or otherwise available from, F2.swf (electronic content C 39 on server device 30) is required. After identifying that such information is required, the supplemental indexing application 43 sends a message 302 to the primary indexing application 34 identifying or requesting the required information. In another example, the external interaction may involve a request that external content, such electronic content C 39, perform a particular function.

The primary indexing application 34 receives message 302 and determines that the external interaction requires execution or other use of electronic content that the primary indexing application 34 cannot, or otherwise does not, analyze itself. In the HTML/swf example, the electronic content B 44 (F1.swf) being analyzed may include an interaction with F2.swf which in this example is electronic content C 39 on server device 30. Accordingly, the primary execution application 34 may send a message 303 to the supplemental indexing application 43 to facilitate identification of content-descriptive terms associated with that external interaction. The message 303 may include or identify the electronic content, e.g., electronic content C 39 (F2.swf), that is involved in the external interaction and request execution or use of that electronic content.

The supplemental indexing application 43 receives message 303 and executes or uses the electronic content that is associated with the external interaction. In the HTML/swf example in which the electronic content B 44 (F1.swf) being analyzed includes an interaction with F2.swf, the supplemental indexing application 43 pauses its analysis of electronic content B after sending message 301. When it subsequently receives message 303 it executes the electronic content C (F2.swf) to identify information associated with the external interaction of F1.swf with F2.swf. It then sends a message 304 to the primary indexing application 34 to provide that information. The primary indexing application uses this information, along with any other information about external interactions of electronic content B 44 (F1.swf) to send message 305 to the supplemental indexing application. This message 305 provides a response to the supplemental indexing application's 34 message 302.

The supplemental indexing application 43 uses any responsive information in message 305 and resumes its analysis of the electronic content B 44. In particular, the supplemental indexing application 43 can use the information to identify content-descriptive terms for the electronic content B 44. Once the supplemental indexing application 43 has finished analyzing the electronic content B 44, it sends a message 204 to the primary indexing application indicating that the analysis is complete. The message 204 may include one or more content-descriptive terms identified for the electronic content B 44. The one or more content-descriptive terms may additionally or alternatively be sent directly to index 52 (shown in FIG. 1) or to any other device or application as may be appropriate for a particular indexing system implementation.

FIG. 3 provides an example of phased-in-time execution of content by a supplemental indexing application 43. The supplemental indexing application 43 is able to pause its analysis of a first piece of electronic content while it analyzes a second piece of electronic content with which the first piece interacts. The supplemental indexing application 43 can then return to analyzing the first piece of electronic content with the included information from the analysis of the second piece of electronic content. Such asynchronous, phased-in-time execution of rich Internet and other electronic content can be provided to, for example, help address the circumstance in which a first rich Internet application interacts with another rich Internet application that must be analyzed by the same indexing application.

The example of FIG. 3 involves a series of back and forth communications between the primary indexing application 34 and a supplemental indexing application 43. Other embodiments may involve fewer or more communications. In one embodiment, messages 304 and 305 are eliminated and message 303 is used to provide any information regarding external interactions available at the primary indexing application 34 and to identify any electronic content (e.g., electronic content C 39) that must be analyzed by the supplemental indexing application 43. In this example, the supplemental indexing application 43 could then perform the additional analysis of that other content (e.g., electronic content C 39) and combine that information with any other information of 303 to complete its analysis of electronic content B 44 and provision of message 306 to the primary indexing application.

An alternative embodiment involves multiple supplemental indexing applications that are accessed by a primary indexing application 34. As an example, an indexing system may involve two supplemental indexing applications that each specialize in identifying content-descriptive terms or otherwise analyzing different types of electronic content. The components of such a system could send messages to ensure that external interactions of electronic content being analyzed are accounted for by ensuring that an appropriate indexing application analyze the electronic content involved in the external communications.

Figure 4:
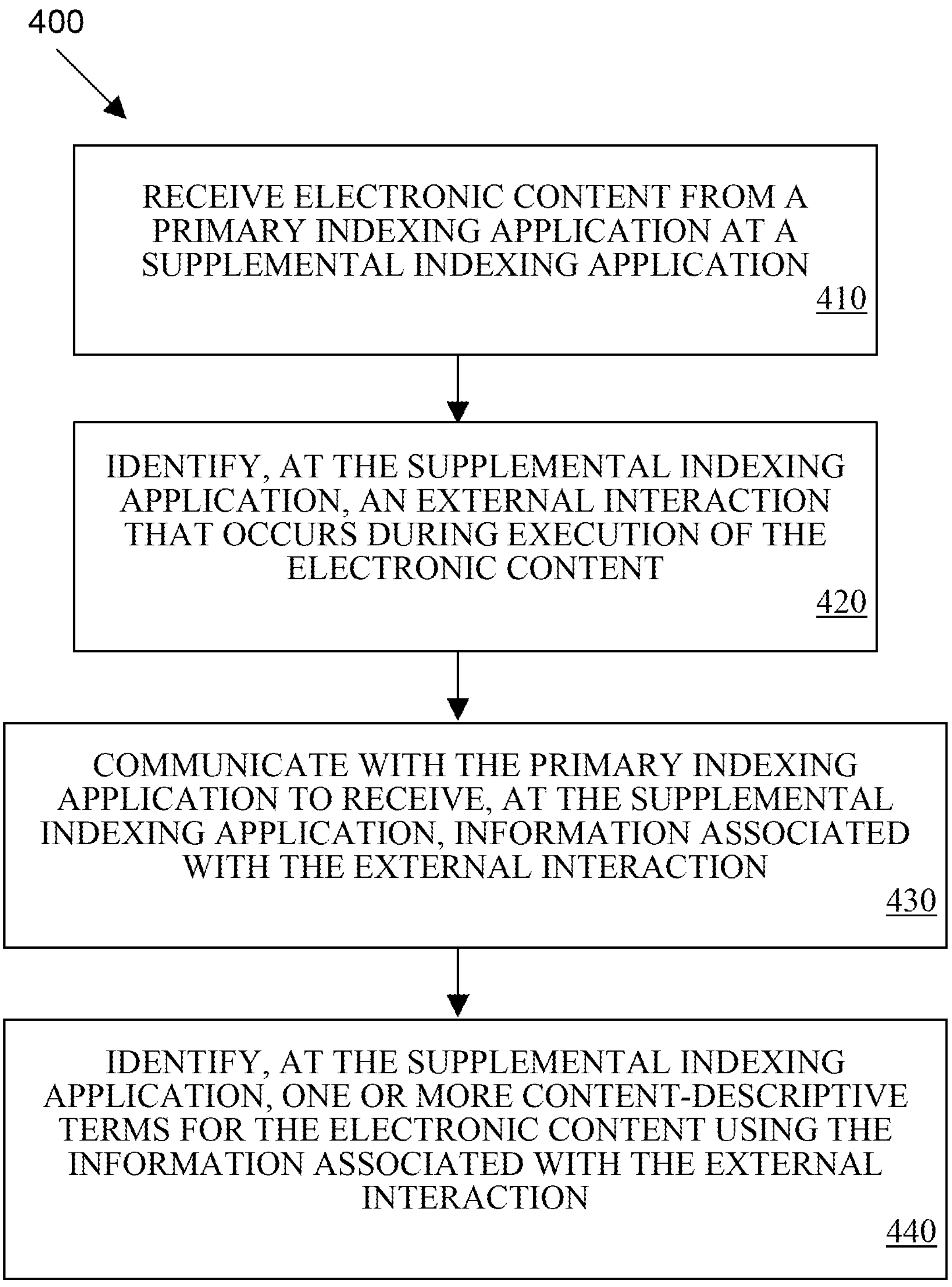
FIG. 4 is a flow chart of an exemplary method of identifying content-descriptive terms for electronic content using a supplemental indexing application to identify such terms.

FIG. 4 is a flow chart of an exemplary method 400 of identifying content-descriptive terms for electronic content using a supplemental indexing application 43 to identify such terms. The supplemental indexing application may perform such an exemplary method in the context of supporting a primary indexing application 34 identifying search terms for a set of content where one or more of the pieces of electronic content cannot be or otherwise are not analyzed by the primary indexing application itself.

The method 400 involves receiving electronic content from a primary indexing application 34 at a supplemental indexing application 43, as shown in block 410. The primary indexing application 34 and the supplemental indexing application 43 are separate applications executing on one or more devices as, for example, illustrated in FIG. 1. In an alternative embodiment, the primary indexing application 34 and the supplemental indexing application 43 are used on a single device.

The exemplary method 400 further involves identifying, at the supplemental indexing application 43, an external interaction that occurs during execution of the electronic content, as shown in block 420. The external interaction is not available from the supplemental indexing application 43. For example, the external interaction may involve obtaining information from one or more separate pieces of electronic content that are not stored on the supplemental indexing application 43. The supplemental indexing application 43 may be restricted from or unable to directly access the web server 20 that provides the electronic content being analyzed for normal use.

Rather than directly completing an external interaction of electronic content being analyzed, the supplemental indexing application 43 can communicate with a separate application such as primary indexing application 34 to mimic the external interaction or otherwise obtain information associated with the external interaction for purposes of improving its ability to identify search terms in the electronic content being analyzed.

In the example of FIG. 4, the exemplary method 400 involves communicating with the primary indexing application 34 to receive, at the supplemental indexing application 43, information associated with the external interaction, as shown in block 430. FIGS. 2 and 3 provide examples of such communications between the primary indexing application 34 and the supplemental indexing application 43.

The exemplary method 400 further involves identifying, at the supplemental indexing application, one or more content-descriptive terms for the electronic content, as shown in block 440. Identifying the one or more content-descriptive terms takes into account the information associated with the external interaction. After identifying applicable content-descriptive terms, the supplemental indexing application can provide those terms for use in an index 52, which ultimately facilitates search engine 33 searching using the content-descriptive search terms of the index. The exemplary method 400 can thus be performed as part of an indexing process that creates, maintains, or otherwise supports and/or improves search engine 33 searching.

The following example is described with respect to a supplemental indexing application 43 that is specifically configured to support identifying content-descriptive terms in Adobe Flash® content. However, the features illustrate concepts that can be applied in alternative contexts, as examples, to support a supplemental indexing application 43 that is specifically configured to support identifying content-descriptive terms in other applications, videos, and other types of electronic content.

A supplemental indexing application 43 that is specifically configured to support identifying content-descriptive terms in Adobe® Flash® content, i.e., content that executes on an Adobe® Flash® Player, may be configured to identify content-descriptive terms by testing all the paths an end user might take while executing the content. In Adobe® Flash® content, tags are used whenever branching occurs during execution. In analyzing a piece of content, once the supplemental indexing application's analysis of on one path is completed, it moves on to another path. Adobe® Flash® content can include various external interactions. For example, Adobe Flash® content can interact with the other electronic content in a browser environment in which the Flash® Player is running. As a specific example, external interactions of Adobe® Flash® content may invoke other browser entities or wait for invocation by such entities.

A supplemental indexing application 43 is configured to account for the external interactions so that encountering such interactions are accounted for in analyzing the electronic content for content-descriptive terms. When such an external interaction is encountered, the supplemental indexing application 43 can send and/or receive messages to access other electronic content present at the primary indexing application. Such messages may have various messages and can have a variety of different formats. In one exemplary embodiment, the messages are implemented as notifications having a common, structured format. A notification can be structured to allow sending and receiving different commands and arguments to handle specific external interaction scenarios.

The following are examples of external interactions handled by a supplemental indexing application 43 that is specifically configured to support identifying content-descriptive terms in Adobe® Flash® content: external interface (EI) communications; Flash® commands; shared object usage; and local connection usage. An example of an EI interface interaction is Adobe® Flash® content invoking Javascript. An example of a Flash® command interaction, is Adobe® Flash® content calling an Actionscript command Examples of shared object usage interactions are information being shared between two pieces of Adobe® Flash® content and information stored on persistent storage by other electronic content. An example of a local connection usage interaction is the use of a socket connection. Messages used with respect to these exemplary interactions are discussed in the following paragraphs.

For each of the exemplary communication types described above, different notification messages are used between the primary indexing application 34 and the supplemental indexing application 43. The following provides an exemplary structure that can be used for different notification messages: string NotifyCall(const string& XML-formatted information). The type and arguments of a particular notification type can be identified in the extensible markup language (XML) formatted information. Other structures may also be used. Similarly, a return value, which may or may not be provided, can be provided as, for example, a string. For void returns, this return value can be empty.

The following is an example of an XML format for sending information:

```
<invoke type="<type of call being handled>">
  <arguments>
    {list of arguments}
  </arguments>
</invoke>
```

The exemplary external interactions EI communications, Flash® commands, shared object usage, and local connection usage can be accounted for using the following exemplary notification types: FSCommand, EICall, EIAddCallback, JS2ASCall, JS2ASReturnValue, SOGetValue, SOSetValue, LCCreate, LCSend. The exemplary argument can be one or a combination of the following exemplary arguments:

1. <string>{string}<string>
2. <true/>
3. <false/>
4. <undefined/>
5. <null/>
6. <number>{value}</number>
7. <date>{value}</date>
8. <array>
   {list of properties as below}
   <property id="{integer value}">
   {one of the types of arguments (1 to 9 here)}
   </property>
   </array>
9. <object>
   {list of properties as below}
   <property id="{string}">
   {one of the types of arguments (1 to 9 here)}
   </property>
   </object>

For the FSCommand type, an exemplary embodiment uses the following arguments:

```
<invoke type="FSCommand">
  <arguments>
```

```
      <string>command</string>
      <string>argument string</string>
    </arguments>
  </invoke>
```

When this command is notified, the primary indexing application 23 establishes a browser context and executes <movieName>_DoFScommand java script function with the command and argument string where <movieName> is the name of the SWF object. The return value in this case is empty.

For the EICall type, an exemplary embodiment uses a first argument that is the java script function name, and the remaining arguments are the arguments for the java script function:

```
  <invoke type="EICall">
    <arguments>
      <string>function name</string>
      <string>argument</string>
    </arguments>
  </invoke>
```

When this command is notified, the primary indexing application 23 establishes a browser context and executes the java script function with the command and argument string.

For the EIAddCallback type, an exemplary embodiment uses a first argument that is the function name:

```
  <invoke type="EIAddCallback">
    <arguments>
      <string>function name</string>
    </arguments>
  </invoke>
```

When this command is notified, the primary indexing application 23 tracks the function and establishes the browser context. For example, when a call is initiated within the parent webpage to this function, the primary indexing application 23 notifies the supplemental indexing application 43.

The JS2ASCall & JS2ASReturnValue types utilize different arguments. For the JS2ASCall external interaction, the first argument can be an Action script function name, and the remainder of the argument list can be the actual argument for the Action script function:

```
  <invoke type="JS2ASCall">
    <arguments>
      <string>function name</string>
      <string>argument</string>
    </arguments>
  </invoke>
```

When this command is notified, the supplemental indexing application 43 tracks the request and executes it in the next execution slot. The return value will be updated using the Notification type JS2ASReturnValue with one argument.

For the SOGetValue type, an exemplary embodiment uses a first argument that is the name of the shared object:

```
  <invoke type="SOGetValue">
    <arguments>
      <string>shared object name</string>
    </arguments>
  </invoke>
```

When this command is notified, the primary indexing application 23 establishes a browser context and obtains the data object or shared object from the browser context to return it to the supplemental indexing application 43.

For the SOSetValue type, an exemplary embodiment uses a first argument that is the name of the shared object and a second that is the data object.

```
  <invoke type="SOGetValue">
    <arguments>
      <string>shared object name</string>
      <object>data</object>
    </arguments>
  </invoke>
```

When this command is notified, the primary indexing application 23 establishes a b browser context and updates the data object of the shared object.

For the LCCreate type, an exemplary embodiment uses a first argument that is the name of the local connection:

```
  <invoke type="LCCreate">
    <arguments>
      <string>local connection</string>
    </arguments>
  </invoke>
```

When this command is notified, the primary indexing application 23 tracks the connection name along with SWF instance. The primary indexing application 23 then establishes a browser context, loads the other content, and routes an LCSend request to the appropriate application for execution.

For the LCSend type, an exemplary embodiment uses a first argument that is the name of the local connection, a second argument that is the name of the Action Script function target and other arguments:

```
  <invoke type="LCSend">
    <arguments>
      <string>local connection</string>
      <string>As function name</string>
      . . . list of arguments . . .
    </arguments>
  </invoke>
```

When this command is notified, the primary indexing application 23 establishes a browser context and loads all SWF files on the page and then passes the request to a SWF registered to receive this request. Then, the supplemental indexing application 43 makes the Action Script call which will be executed in its next execution slot. The identification and execution of the matching registered SWF can be done offline by the primary indexing application 23.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A computer-implemented method comprising:

receiving, at a supplemental indexing application, electronic content from a primary indexing application via a first message, wherein the primary indexing application and the supplemental indexing application are separate applications executing on one or more devices, wherein the electronic content comprises executable code that does not fully expose content-defining text without execution of the electronic content by the supplemental indexing application, wherein the primary indexing application is unable to execute the executable code;

identifying, at the supplemental indexing application, an external interaction that occurs during execution of the electronic content, wherein the external interaction is not available from the supplemental indexing application;

communicating with the primary indexing application via a second message from the supplemental indexing application requesting performance of a function by electronic content available to the primary indexing application but not available to the supplemental indexing application, to receive, at the supplemental indexing application, information associated with the external interaction, wherein the information associated with the external interaction comprises a result of a function performed by the primary indexing application on the electronic content;

identifying, at the supplemental indexing application, one or more content-descriptive terms for the electronic content, wherein said identifying the one or more content-descriptive terms comprises using the information associated with the external interaction.

2. The method of claim 1 wherein the communicating further comprises the primary indexing application sending additional electronic content to the supplemental indexing application so that the supplemental indexing application initiates the function using the additional electronic content.

3. The method of claim 1 wherein the communicating comprises the supplemental indexing application receiving another file to execute.

4. The method of claim 1 wherein the external interaction comprises executing a command that provides a result, wherein the communicating comprises the supplemental indexing application receiving the result.

5. The method of claim 1 wherein the external interaction comprises accessing an object that is shared with other electronic content external to the electronic content.

6. The method of claim 1 wherein the external interaction uses a socket connection.

7. The method of claim 1 further comprising providing said one or more search terms from the supplemental indexing application to the primary indexing application for use in an index that supports a search engine.

8. The method of claim 1 wherein the electronic content comprises a rich Internet application.

9. The method of claim 1, wherein the external interaction comprises an external interaction selected from the list consisting of a rich internet application invoking Javascript, the rich internet application calling an scripted language command, the rich internet application stored on persistent storage by other electronic content, and rich internet application information stored on persistent storage by other electronic content.

10. A system comprising:

a primary indexing application provided by one or more processors of one or more devices executing instructions, the primary indexing application receiving a first piece of electronic content and a second piece of electronic content; and a supplemental indexing application provided by one or more of the processors of one or more of the devices executing additional instructions, the supplemental indexing application receiving the second piece of electronic content via a first message from the primary indexing application, identifying content-descriptive terms for the second piece of electronic content, wherein the second piece of electronic content comprises executable code that does not fully expose content-defining text without execution of the electronic content by the supplemental indexing application, wherein the primary indexing application is unable to execute the executable code, and wherein identifying the content descriptive terms comprises:

identifying, at the supplemental indexing application, an external interaction with the first piece of electronic content that occurs during execution of the second piece of electronic content, wherein the external interaction is not available from the supplemental indexing application;

communicating with the primary indexing application via a second message from the supplemental indexing application requesting performance of a function by the first piece of electronic content available to the primary indexing application but not available to the supplemental indexing application, to receive, at the supplemental indexing application, information associated with the external interaction, wherein the information associated with the external interaction comprises a result of a function performed by the primary indexing application on the first piece of electronic content; and identifying, at the supplemental indexing application, at least some of the content-descriptive terms for the second piece of electronic content using the information associated with the external interaction.

11. The system of claim 10 wherein the communicating further comprises the primary indexing application sending the first piece of electronic content to the supplemental indexing application so that the supplemental indexing application initiates the function using the first piece of electronic content.

12. The system of claim 10 wherein the external interaction comprises executing a command that provides a result, wherein the communicating comprises the supplemental indexing application receiving the result.

13. The system of claim 10 wherein the external interaction comprises accessing an object that is shared between the first electronic content and the second electronic content.

14. The system of claim 10 wherein the external interaction uses a socket connection.

15. A non-transitory computer-readable medium on which is encoded program code, the program code comprising:

program code for receiving electronic content from a primary indexing application at a supplemental indexing application via a first message, wherein the primary indexing application and the supplemental indexing application are separate applications executing on one or more devices, wherein the electronic content comprises executable code that does not fully expose content-defining text without execution of the electronic content by the supplemental indexing application, and wherein the primary indexing application is unable to execute the executable code;

program code for identifying, at the supplemental indexing application, an external interaction that occurs during execution of the electronic content, wherein the external interaction is not available from the supplemental indexing application;

program code for communicating with the primary indexing application via a second message from the supplemental indexing application requesting performance of a function by electronic content available to the primary indexing application but not available to the supplemental indexing application, to receive, at the supplemental indexing application, information associated with the external interaction, wherein the information associated with the external interaction comprises a result of a function performed by the primary indexing application on the electronic content;

program code for identifying, at the supplemental indexing application, one or more content-descriptive terms for the electronic content, wherein said identifying the one or more content-descriptive terms comprises using the information associated with the external interaction.

* * * * *